(12) United States Patent
Siorek et al.

(10) Patent No.: US 7,596,635 B2
(45) Date of Patent: Sep. 29, 2009

(54) METHOD AND APPARATUS FOR PROVIDING REDUNDANT I/O ADAPTERS IN MACHINE AND PROCESS CONTROLLERS

(75) Inventors: Timothy Siorek, Newbury, OH (US); Joseph G. Vazach, Mentor, OH (US); Yas Harasawa, Twinsburg, OH (US); Robert J. Kretschmann, Bay Village, OH (US)

(73) Assignee: Rockwell Automation Technologies, Inc., Mayfield Heights, OH (US)

( * ) Notice: Subject to any disclaimer, the term of this patent is extended or adjusted under 35 U.S.C. 154(b) by 269 days.

(21) Appl. No.: 11/167,700

(22) Filed: Jun. 27, 2005

(65) Prior Publication Data

US 2007/0016701 A1    Jan. 18, 2007

(51) Int. Cl.
*G06F 11/16*    (2006.01)

(52) U.S. Cl. .............................. 710/7; 710/15; 710/17; 710/18; 710/20

(58) Field of Classification Search .................. 710/316, 710/62; 370/217, 221
See application file for complete search history.

(56) References Cited

U.S. PATENT DOCUMENTS

| | | | |
|---|---|---|---|
| 5,777,874 A | 7/1998 | Flood et al. | |
| 5,912,814 A | 6/1999 | Flood | |
| 6,314,525 B1 * | 11/2001 | Mahalingham et al. | 370/217 |
| 6,662,247 B1 | 12/2003 | Ales et al. | |
| 6,754,846 B2 * | 6/2004 | Rasmussen et al. | 714/11 |
| 2004/0068591 A1 * | 4/2004 | Workman et al. | 710/58 |
| 2006/0015692 A1 * | 1/2006 | Schnapp et al. | 711/154 |

\* cited by examiner

Primary Examiner—Henry W. H. Tsai
Assistant Examiner—Cheng-Yuan Tseng
(74) Attorney, Agent, or Firm—Boyle Fredrickson LLP; R. Scott Speroff

(57) ABSTRACT

Methods and apparatus for redundancy in machine or process control systems provide redundant communication adapters located with the groups of I/O modules, so that if the first communication adapter faults or becomes unavailable, a second communication adapter will perform all of the necessary functions of the first adapter. The adapters are connected to a multiplexing module for communicating input data from the I/O modules to the communication adapters, for exchanging initialization data with the first communication adapter and the second communication adapter to initialize the redundant mode of operation and for monitoring communication of the first communication adapter and the second communication adapter on the network to start up the second adapter as the primary adapter for communicating both input data and output data with the I/O modules.

8 Claims, 8 Drawing Sheets

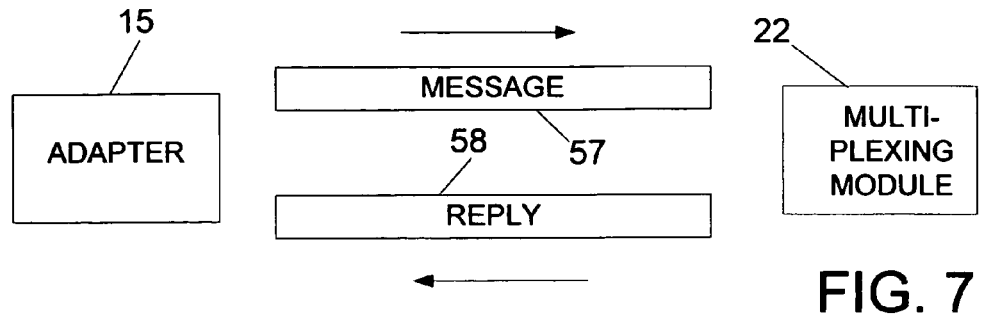
FIG. 7
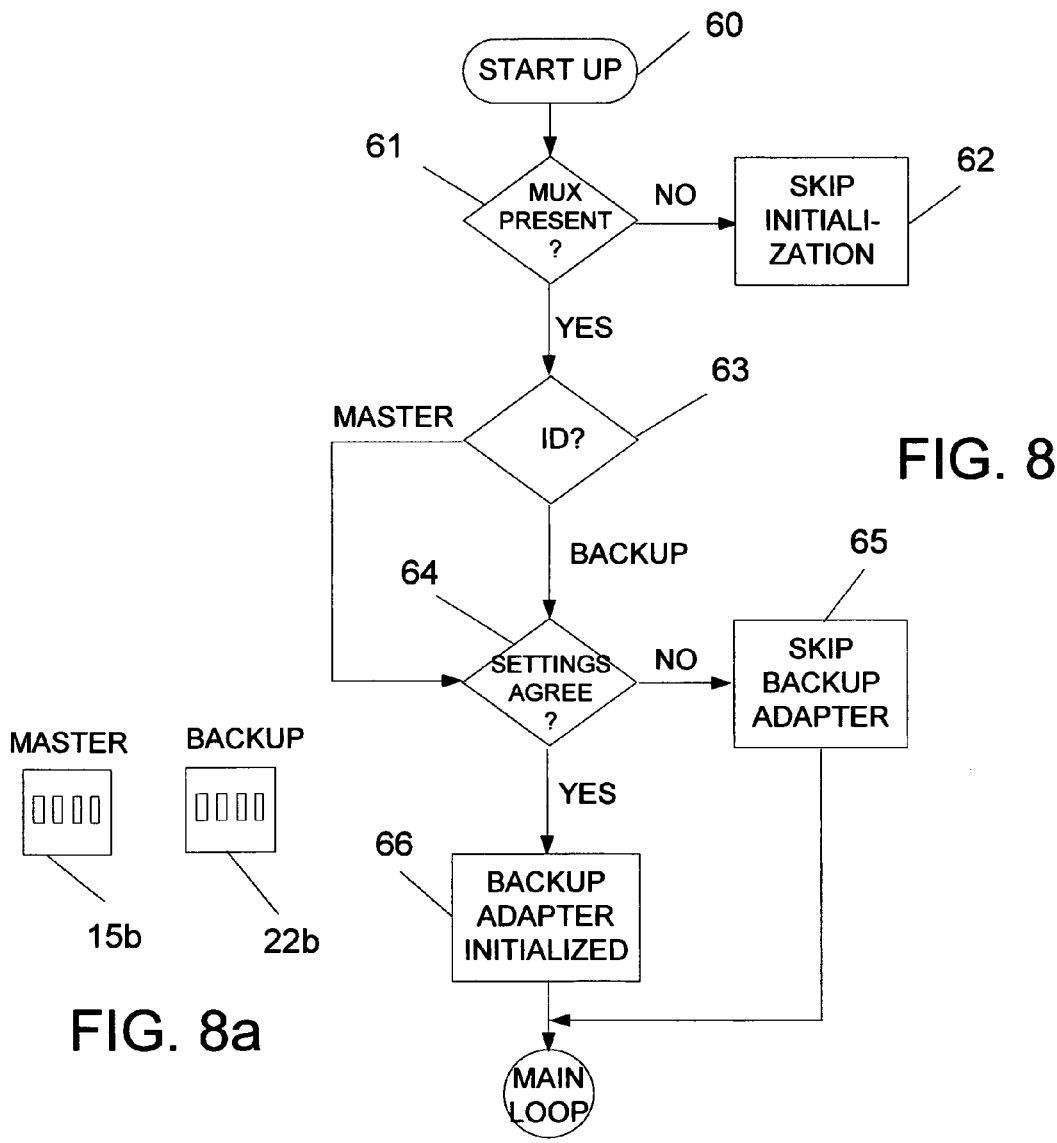
FIG. 8
FIG. 8a

METHOD AND APPARATUS FOR PROVIDING REDUNDANT I/O ADAPTERS IN MACHINE AND PROCESS CONTROLLERS

CROSS-REFERENCE TO RELATED APPLICATIONS

Not Applicable

STATEMENT REGARDING FEDERALLY SPONSORED RESEARCH

Not Applicable

TECHNICAL FIELD

The field of the invention is control systems for controlling the operation of machines and processes.

BACKGROUND ART

Machine and process controllers include a controller processor and I/O modules, the latter connecting to I/O devices on a machine or process. The term "I/O modules" is a general classification that includes input modules that receive signals from input devices such as photo-sensors and proximity switches, output modules that use output signals to energize relays or to start motors, and bidirectional I/O modules, such as motion control modules which can direct motion devices and receive position or speed feedback. Early I/O modules converted between AC and DC analog signals used by devices on a controlled machine or process and +5-volt DC logic signals used by the controller. Later I/O modules provided digital signals to digital I/O devices and received digital signals from digital I/O devices. Some I/O modules that are used to control motion devices or process control devices require local microcomputing capability on the I/O module.

Input data is collected from I/O modules and communicated to the controller processor. The controller processor performs logic operations on the input data to produce output data which is then communicated back to the I/O module having output capability. Controller processors have grown in computational ability and thus have increased communication requirements to larger groups of remotely located I/O devices. This has resulted in the common use of communication scanners and adapters. An I/O scanner is located near the controller processor and interfaces the controller processor through a distributed I/O network having a plurality of remote locations which can be at great distances from the controller processor. At various locations in the network, collections of I/O modules are interfaced in groups to the network by a communication adapter module known as an I/O adapter.

Originally one group of controller products was developed for machine and assembly line control, while another group of controller products was developed for process control. With the advances in microelectronics and microcomputers, the product lines are becoming suitable for both types of applications.

In process control, such as in the food and beverage industry, or in the petrochemical industry, there is a need for redundancy of systems to avoid an interruption in operation that would lead to a loss of the process batch. In machine and assembly line control, control systems must be designed so as to avoid down time. In many computer operations, there is a need for redundancy. Quite often this has led to complete redundancy of computers, using a primary computer and a backup computer operating in tandem.

Flood et al., U.S. Pat. No. 5,777,874, issued Jul. 7, 1998, disclosed a programmable controller backup system in which a primary controller processor was linked with a backup controller processor, each processor having an associated I/O scanner for communicating over a network to groups of I/O modules. If the primary controller processor became unavailable, control was shifted to the backup controller processor and its I/O scanner.

Flood, U.S. Pat. No. 5,912,814, issued Jul. 15, 1999, addressed a further problem in such a backup system in which the input data in the I/O table in the backup controller processor is not as current as the input data in the I/O table data in the primary controller processor. This can result in the output devices being set to a prior state at the time of changeover to the backup system and followed by a return to the present state and this is known as a "data bump." The Flood '814 patent provides a solution for bumpless switching from the primary controller processor to the backup controller processor.

The provision of redundant controller systems is a solution with substantial cost in terms of equipment. It would be advantageous to provide redundancy in other ways that would be less costly and more directly related to the type of faults that may occur in controller systems.

SUMMARY OF THE INVENTION

The present invention relates generally to methods and equipment for providing redundancy or backup in machine or process control systems. The present invention provides redundant I/O adapters located with the groups of I/O modules for interfacing the I/O modules to a distributed controller data I/O network. If the first communication adapter faults or becomes unavailable, a second communication adapter will perform all of the necessary functions of the first adapter.

The adapters are connected to a multiplexing module. The multiplexing module communicates data to and from the I/O modules to the communication adapters. The multiplexing module also exchanges initialization data with the first communication adapter and the second communication adapter to initialize a redundant or backup mode of operation. And, the multiplexing module monitors communication of the first communication adapter and the second communication adapter on the controller data I/O network. If the first adapter stops communicating, the multiplexing module starts up the second adapter as the primary adapter for communicating both input data and output data with the I/O modules.

The multiplexing module assists in the switchover from the first communication adapter to the second communication adapter. The multiplexing module allows the second communication adapter to update input data from the I/O modules so as to avoid data bumps, before communicating any output data to the I/O modules.

In a further aspect of the invention, the multiplexing module is inserted between the first communication adapter and its associated I/O modules and is connected to the second adapter through a serial data cable.

The I/O adapters operate at the same network address on the controller data I/O network and are updated during an I/O scan performed by an I/O scanner at the head end of the network. The second communication adapter will be transparent to the controller processor, I/O scanner and other upstream nodes on the network, which will not detect which communication adapter is the primary adapter at any give time.

The invention will enable one to provide backup adapters for several types of I/O module product lines having different types of electrical and physical characteristics.

These and other objects and advantages of the invention will be apparent from the description that follows and from the drawings which illustrate embodiments of the invention, and which are incorporated herein by reference.

BRIEF DESCRIPTION OF THE DRAWINGS

FIG. 7 is a diagram of the messages communicated between the adapter and the multiplexing module;

FIG. 8 is a flow chart of the operation of the adapters in initializing a redundant adapter mode of operation;

FIG. 8a is a detail view of the switches for setting addresses on the adapter modules of the present invention;

DETAILED DESCRIPTION OF THE PREFERRED EMBODIMENTS

Figure 1:
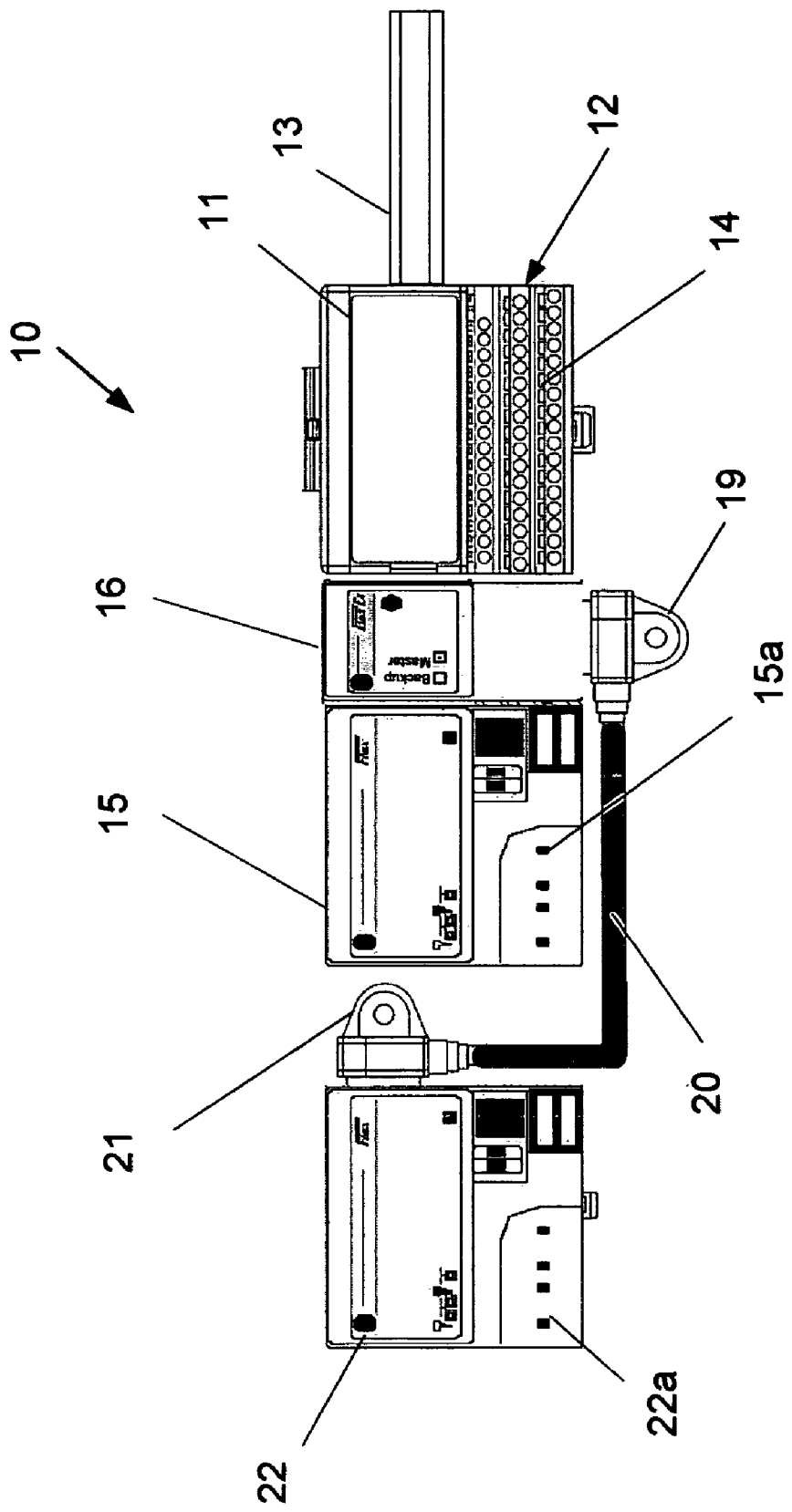
FIG. 1 is a front view in elevation of one configuration of I/O equipment for carrying out the present invention.

FIG. 1 is a front view in elevation of one configuration of I/O equipment 10 for carrying out the present invention. I/O modules 11 are mounted on terminal bases 12, which in turn are mounted on a DIN rail 13. These items are commercially available under the trade designation 1794 Flex I/O from the assignee of the present invention. While the preferred embodiment is described in relation to this product line, the invention can also be applied to other I/O product line configurations including, but not limited to: 1769 Compact I/O, 1756 ControlLogix I/O and 1734 Point I/O product lines of the assignee herein.

The I/O modules 11 offer provide circuits for I/O data points in a range from four to thirty-two for each module. There are up to eight I/O modules 11 for each I/O group 10 providing up to two hundred and fifty-six data points per assembly. The I/O modules 11 not only plug into module terminal bases 12 but also plug into each other at the ends. The module terminal bases 12 provide a backplane that forms a serial data I/O bus and also provide terminals 14 on the front side for connecting via I/O wires to I/O devices on a controlled machine or process. A conventional I/O adapter module would plug into an end terminal base on the DIN rail 13, which would plug into the terminal base 12 for the I/O module 11.

In the present invention, a multiplexing module 16 is plugged into a base on the DIN rail 13 next to the I/O module 11. A master adapter module 15 is plugged into an end terminal base that is mounted on the DIN rail 13 and is connected on one end to the base for the multiplexing module 16. In addition, the multiplexing module 16 has a serial bus connector 19 which can be connected through a cable 20 to a similar connector 21 on a backup or redundant adapter module 22. The master adapter 15 and the backup adapter 22 have respective connectors 15a and 22a for receiving a network connector for one of a plurality of possible controller data I/O networks 27 available from the assignee under the trade designations Ethernet/IP, ControlNet, Local I/O or Universal Remote I/O, and other networks known in the art, which communicate data with a controller processor 25. Typically, these networks are serial data networks that utilize serial data methods and protocols. This connection of the adapters 15 and 22 to the selected controller data I/O network 27 (FIG. 2) allows the adapters 15 and 22 to receive output data from the I/O scanner 26 during an I/O scan operation of a type that is well known in the art.

Figure 2:
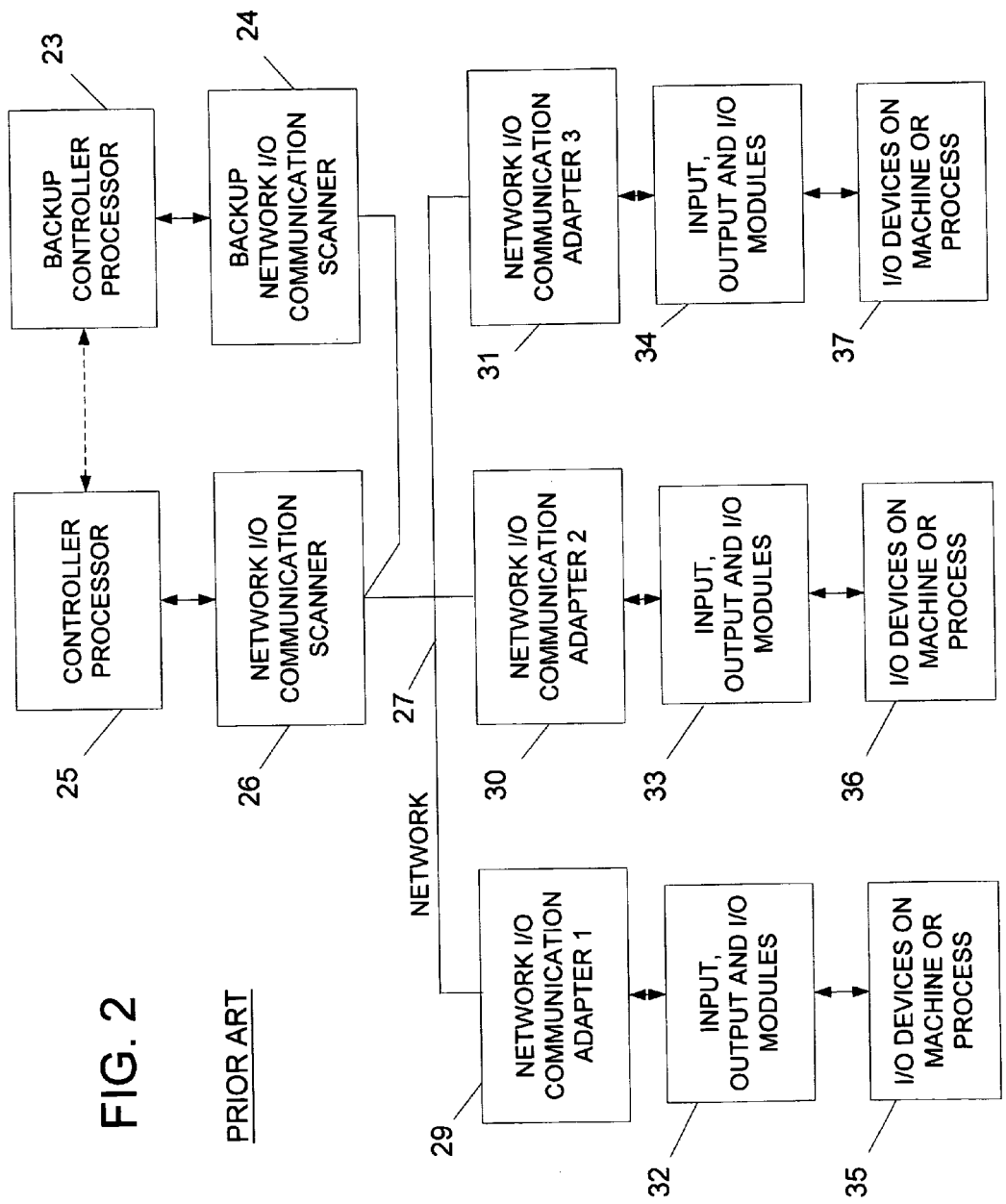
FIG. 2 is a block diagram of a prior art system using a backup controller processor and I/O scanner.

A block diagram of the control system prior to the present invention is shown in FIG. 2. A controller processor 25 interfaces to the controller data I/O network 27 through a network I/O communication scanner module 26. The controller data I/O network 27 connects to three I/O groups at locations of various distances from the controller processor 25 through a network cable to three I/O communication adapters 29, 30 and 31. These adapters 29-31 communicate I/O data through a backplane to and from groups of I/O modules 32, 33 and 34. The I/O modules 32-34 in turn connect to groups of I/O devices 35, 36 and 37 on a controlled machine or process.

FIG. 2 shows the added feature of the prior art in providing a backup or redundant controller processor 23 and a redundant network I/O communication scanner 24. Flood et al., U.S. Pat. No. 5,777,874, issued Jul. 7, 1998, disclosed a programmable controller backup system in which a primary controller processor was linked with a backup controller processor, each processor having an associated I/O scanner If the primary controller processor became unavailable, control was shifted to the backup controller processor and its I/O scanner.

Figure 3:
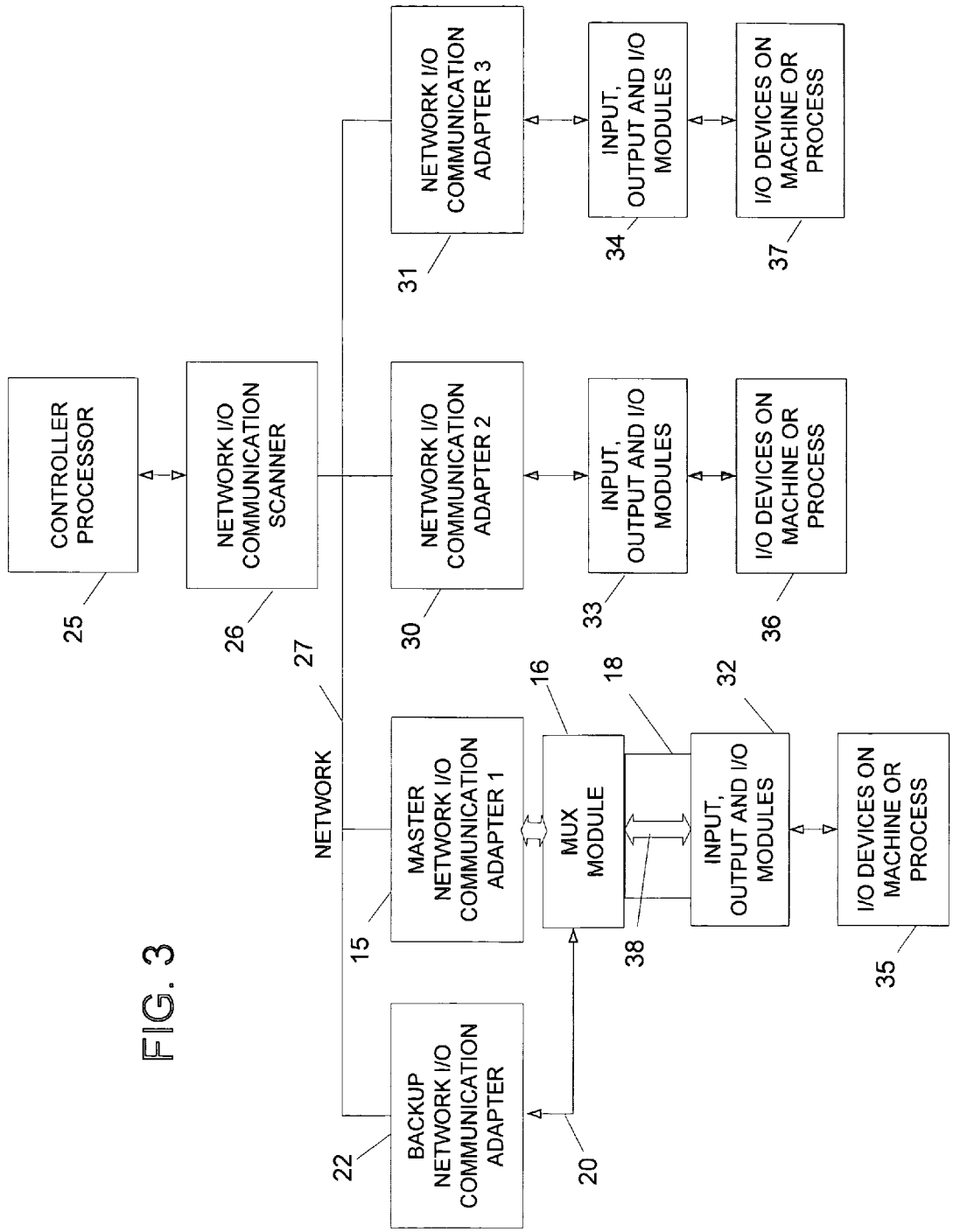
FIG. 3 is a block diagram showing a modification made to FIG. 2 according to the present invention.

FIG. 3 shows a modification to this arrangement made by the present invention. In this case, there is no backup or redundant controller processor and there is no redundant network I/O communication scanner, however these could be utilized in addition to the present invention. The present invention, however, utilizes a master I/O adapter 15 connected to the multiplexing module 16. The multiplexing module 16 connects to a terminal base 18 which forms the I/O bus 38 in the region between a master I/O adapter 15 and its associated I/O modules 32. The multiplexing module 16 is, in turn connected to a backup I/O adapter 22, through a multiplexing module cable 20, which can be a serial data cable or a parallel data cable. The backup I/O adapter 22 also receives serial data through the controller data I/O network 27.

Figure 4:
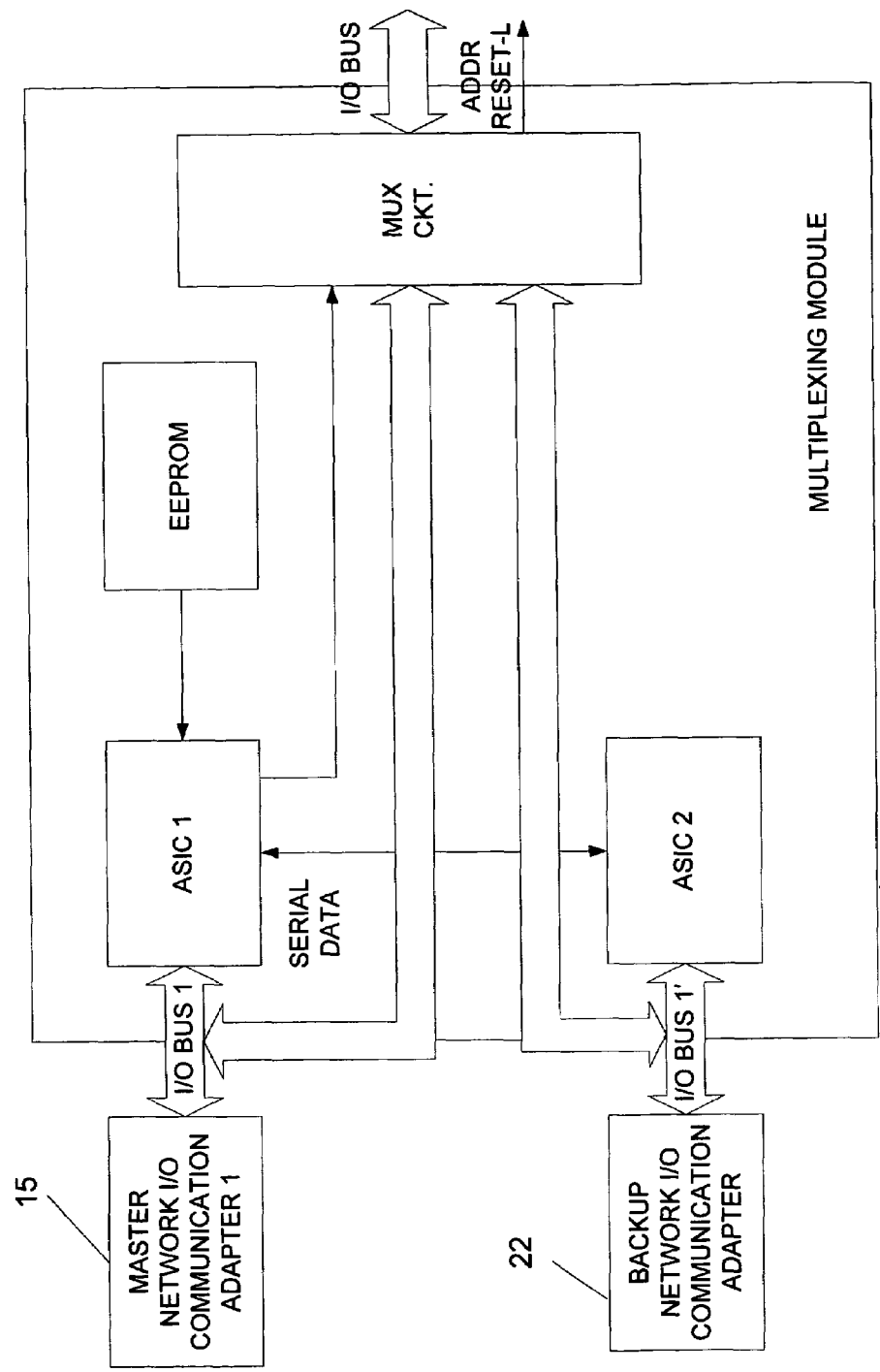
FIG. 4 is a block diagram of a multiplexing module of the present invention.

FIG. 4 shows a block diagram of the multiplexing module 16. The module has two application specific integrated circuits (ASICs) identified here as ASIC 1 and ASIC 2. Each of these circuits has lines (I/O BUS1, I/O BUS 1') for connecting through an I/O bus to a respective one of the adapters 15, 22.

The multiplexing module 16 will reside in the first I/O module position and will have a unique ID number. The firmware in the redundant adapters 15, 22 will switch into a redundant adapter mode of operation when they detect this specific ID number. ASIC 1 and ASIC 2 will communicate data with each other via data ports. Preferably, these handle serial but parallel data transfer can also be used here. The 8051 CPUs inside the ASIC 1 and ASIC 2 will determine which adapter 15, 22 is functionally connected to the I/O modules 32 seen in FIG. 3. To perform this task, a device such as the EEPROM is provided to store programmed logic that can be loaded into application specific integrated circuits, ASIC 1 and ASIC 2.

Information can be transmitted from the master adapter 15 to the backup adapter 22 through the application specific integrated circuits, ASIC 1 and ASIC 2. When the master adapter 15 detects the multiplexing module 16, it will send the required information to the associated ASIC 1, which will pass the information to ASIC 2. ASIC 2 will reply to ASIC 1.

Because the multiplexing module 16 is an extra module on the I/O bus 38 in FIG. 3, a "Reset-L" signal will be used to select one of two sets of eight virtual I/O modules, while still performing a slightly modified version of the Reset-L function. Virtual I/O modules are logical representations in memory of the physical I/O. As a result, this line is designated as ADDR/RESET-L line. The ADDR/RESET-L signal will now continually change state when the module 16 is functioning in the redundant adapter mode.

When the ADDR/RESET-L is high, the multiplexing module 16 will select the standard eight virtual I/O modules for communication with the adapter 15. When the ADDR/RESET-L is low for more than a time frame such as 20 ms, the multiplexing module 16 will transmit a RESET signal to the physical I/O modules. Also, the multiplexing module 16 will issue an immediate RESET signal to the physical I/O modules whenever a high-to-low transition occurs on the ADDR/RESET-L line and a SELECT signal is active. When the ADDR/RESET-L line is low for a time less than a time frame such as 20 ms, then the multiplexing module 16 will de-select the standard eight virtual I/O modules and will select a second set of virtual I/O modules. The multiplexing module 16 will be located at the address for the first module in this second set of virtual I/O modules.

Figure 5:
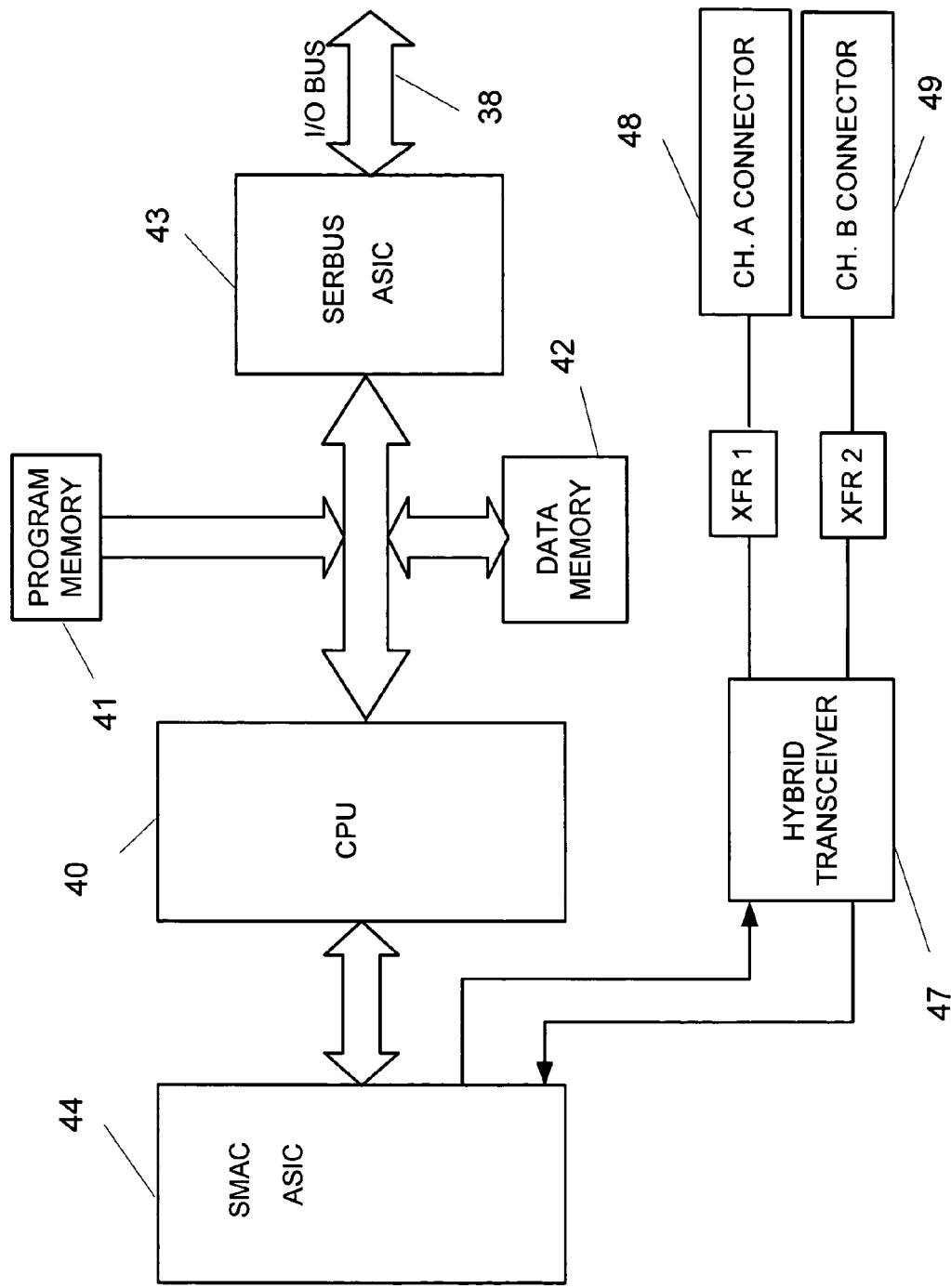
FIG. 5 is a block diagram of an I/O adapter of the present invention.

FIG. 5 shows a block diagram for the adapter modules 15, 22. Each adapter module 15, 22 has a CPU 40, a non-volatile program memory 41, a read/write data memory 42 and a backplane ASIC 43 for interfacing to the I/O bus 38. There is also a network interface ASIC 44 for interfacing to the controller data I/O network 27 through a controller network physical layer interface 47 which may include, for example, a hybrid transceiver, two signal conditioning circuits and connectors for two channels.

Figure 6:
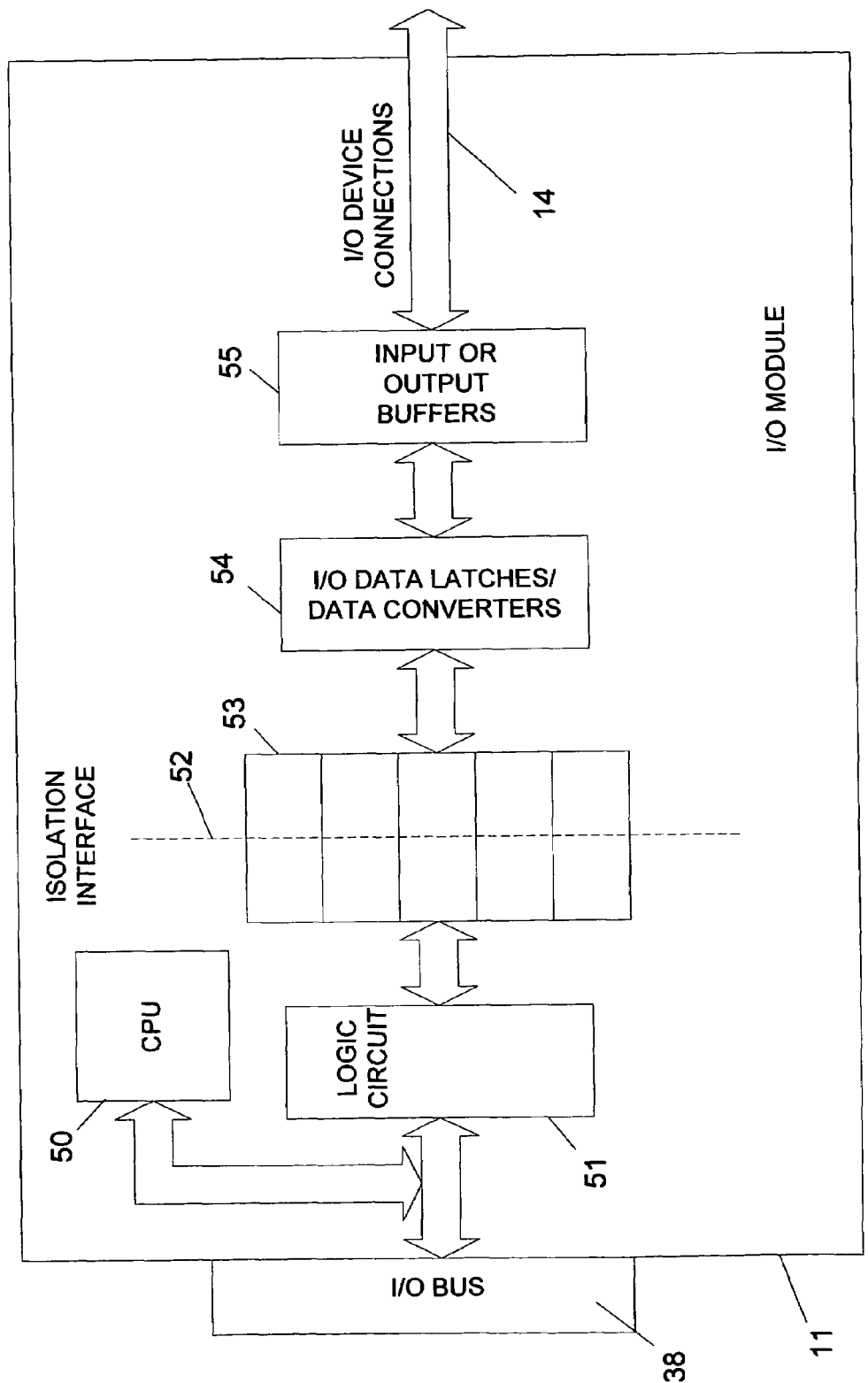
FIG. 6 is a generalized block diagram of one of the I/O modules utilized in the present invention.

A typical physical I/O module is seen in FIG. 6. The physical I/O module 11 may optionally include a microelectronic CPU 50 for controlling higher capacity data exchanges with I/O devices. The I/O module 11 typically provides physical and electrical isolation through an isolation interface 52 typically provided by opto-isolator circuits 53. A logic circuit 51 interfaces the I/O bus 38 to the module. Data is typically held in latches 54 on the machine or process side of the isolation interface 52. This data represents the state of input devices in the case of input data or controls the state of output devices in the case of output data. Typically, signal conditioning buffers 55 are provided between the latches 54 and the terminals 14 for connecting to I/O devices.

As represented in FIG. 7, upon powering up, the adapters 15, 22 and the multiplexing module 16 exchange messages with the adapters 15, 22 sending a first message and the multiplexing module 16 sending a reply message.

As seen in FIG. 8, a start up operation involving the adapters 15, 22 and the multiplexing module 16 is initiated on power up as represented by start block 60. Then, the adapters send messages to determine if a multiplexing module 16 is present as represented by decision block 61. If no multiplexing module 16 is present, then the remainder of the initialization process in FIG. 8 is skipped as represented by process block 62. If a multiplexing module 16 is present, then a check is made for a proper ID address being returned in a reply message 58 from the multiplexing module 16. If the master adapter receives this message, as represented by the first branch from decision block 63, it proceeds to check for a match of the address switch settings between the master adapter 15 and a backup adapter 22. Each adapter 15, 22 has a DIP switch or thumbwheel switch 15b, 22b which is set by the user to determine its I/O address. These addresses could also be programmed in a memory so as make the external switches unnecessary. The master adapter 15 and the backup adapter 22 are arranged to operate from the same address in this embodiment, with the backup adapter 22 being transparent to the network 27. The upstream nodes on the network, such as the I/O scanner 26 and the controller processor 25, are not signaled when a second communication adapter is installed at said network communication address on the serial data I/O network. If the switch settings agree as represented by the "Yes" result from decision block 64, then the backup adapter is initialized, as represented by process block 66. If the switch settings do not agree as represented by the "No" result from decision block 64, then the backup adapter is not initialized, as represented by process block 65. The backup adapter 22 also checks for the proper ID from the multiplexing module as represented by the second branch from decision block 63, and also checks for proper switch settings relative to the master adapter 15 as represented by blocks 64-66. When a backup adapter has been initialized, the I/O assembly 10 is operating in a redundant mode.

Figure 9:
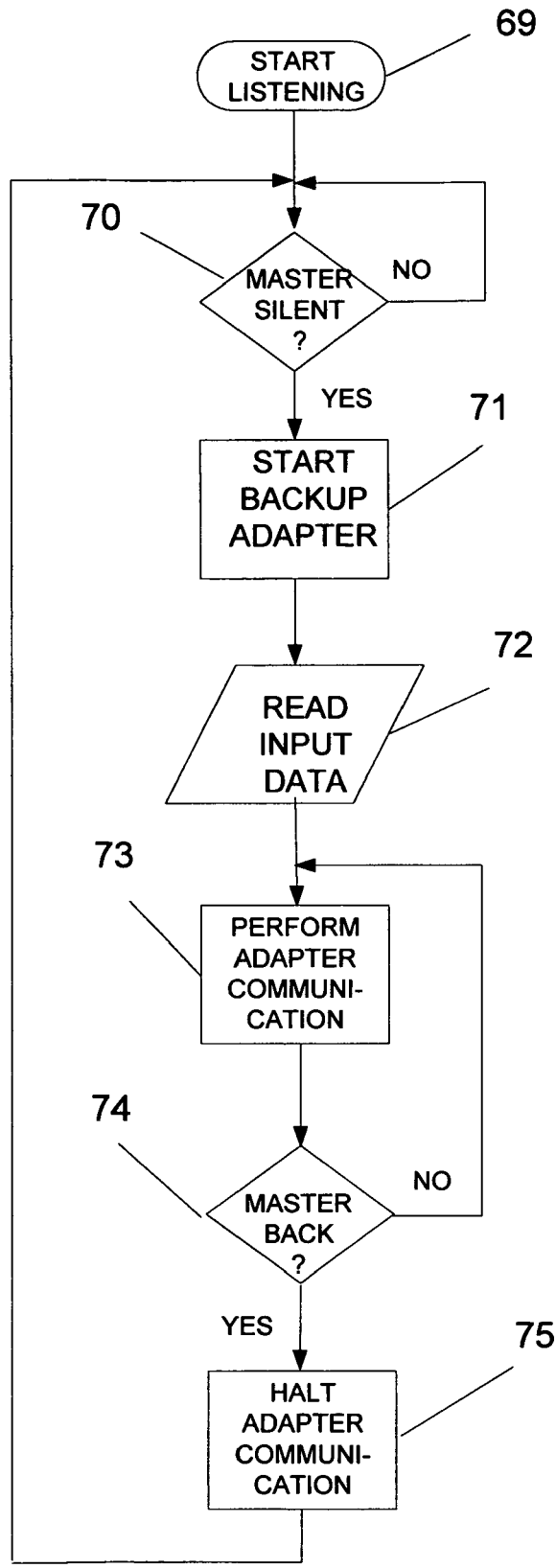
FIG. 9 is a flow chart of the bumpless switchover from a primary adapter to backup adapter according to the present invention.

Referring to FIG. 9, during operation in the redundant mode, there is a "hot backup" mode in which a bumpless data switchover is executed, In the redundant mode, the network interface ASIC in the backup adapter 22 monitors network traffic from the master adapter 15 as represented by start block 69. When it stops hearing from the master adapter 15, as represented by the "Yes" result from decision block 70, it starts up the backup adapter 29 operating on the network, as represented by process block 71. It should be noted that upstream nodes on the network are not signaled when the second communication adapter becomes the primary communication adapter for communicating with the I/O modules. To provide for bumpless transfer of the I/O modules, it causes input data to be read, as represented by I/O block 72, before transmitting any output data to the I/O modules during regular communication, represented by process block 73. Generally, output data in the master adapter 15 and the backup adapter 22 are of the same time reference, and it is input data which may be more current in the master adapter 15 than the backup adapter 22. When the master adapter 15 comes back online, as represented by the "Yes" result from decision block 74, the master adapter 15 signals the backup adapter 22 to stop communicating (via the multiplexing module 16) as represented by process block 75. This will allow the network interface ASIC 44 on the master adapter 15 to start communicating on the network 27 as the master adapter 15 returns to controlling the I/O modules 11.

Thus, from the above description it should now be apparent how redundant I/O adapters can be located with the groups of I/O modules, so that if the first communication adapter faults or becomes unavailable, a second communication adapter will perform all of the necessary functions of the first adapter.

The description has included details of how to initialize the redundant mode of operation, and how to monitor communication of the first communication adapter and the second communication adapter on the network and how to start up the second adapter as the primary adapter for communicating both input data and output data with the I/O modules.

The description has further described how the second communication adapter, when switching over to control the I/O modules, updates inputs data from the I/O modules so as to avoid data bumps.

This has been a description of several preferred embodiments of the invention. It will be apparent that various modifications and details can be varied without departing from the scope and spirit of the invention, and these are intended to come within the scope of the following claims.

We claim:

1. Apparatus for interfacing I/O modules having terminals accessible for attaching I/O wires to an I/O device on a controlled machine to a controller data I/O network in a machine or process control system having an industrial controller executing a stored program to control the machine or process, the apparatus comprising:

a first communication adapter having a mounting surface and an electrical connection on a sidewall perpendicular to the mounting surface to communicate with the industrial controller through the controller data I/O network;

a multiplexing module having a mounting surface, a first electrical connection on a first sidewall perpendicular to the mounting surface to mate with the electrical connection of the first communication adapter, and a second electrical connection on a second sidewall parallel to the first sidewall to allow the first communication adapter to communicate with the I/O modules, the multiplexing module including a serial bus connector; and a second communication adapter having a mounting surface, an electrical connection on a side wall perpendicular to the mounting surface and connected to a cable connecting to the serial bus connector of the multiplexing module and configured to provide an interface between the controller data I/O network and the machine or process, a network interface circuit configured to communicate with the industrial controller through the controller data I/O network; and an I/O data bus interface circuit for communicating with the I/O modules through an I/O data bus;

wherein said second communication adapter and said first communication adapter receive output data from the controller through the controller data I/O network;

wherein said second communication adapter and said first communication adapter each transmit output data through the I/O data bus when enabled as a primary communication adapter for the I/O modules, wherein in a redundant mode of operation, the multiplexing module monitors the network to determine that the first communication adapter has stopped communicating and that the second communication adapter should become the primary adapter for communicating with the I/O modules, and wherein the multiplexing module is connected to the I/O data bus in a position between the first communication adapter and the I/O modules.

2. The apparatus of claim 1, wherein the multiplexing module is connected for communication with the second I/O adapter through one of a serial data cable and a parallel data cable.

3. The apparatus of claim 1, wherein the mounting surfaces are configured to mounting to a DIN rail.

4. The apparatus of claim 1, wherein the first communication adapter is located at a specific address on the controller data I/O network, and the second communication adapter is located at the address on the controller data I/O network of the first communication adapter, as determined by switch settings on the first communication adapter and the second communication adapter.

5. The apparatus of claim 1, wherein data is exchanged between the multiplexing module and each of the first communication adapter and the second communication adapter to initialize the first communication adapter and the second communication adapter in the redundant mode of operation.

6. The apparatus of claim 1, wherein upstream nodes on the I/O network are not signaled when a second communication adapter is installed at the network address of the first communication adapter on the controller data I/O network nor when the second communication adapter becomes the primary communication adapter for communicating with the I/O modules.

7. The apparatus of claim 1, wherein the first communication adapter is located at a specific address on the controller data I/O network, and the second communication adapter is located at the address on the network of the first communication adapter.

8. The apparatus of claim 1, wherein determination of which communication adapter is the primary communication adapter for communicating between the I/O modules and the controller data I/O network is made through exchanging control data between a multiplexing module and each of the first communication adapter and the second communication adapter.

* * * * *

UNITED STATES PATENT AND TRADEMARK OFFICE
CERTIFICATE OF CORRECTION

PATENT NO. : 7,596,635 B2
APPLICATION NO. : 11/167700
DATED : September 29, 2009
INVENTOR(S) : Siorek et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 278 days.

Signed and Sealed this

Twenty-eighth Day of September, 2010

David J. Kappos
*Director of the United States Patent and Trademark Office*